United States Patent [19]
Andreas

[11] Patent Number: 5,977,869
[45] Date of Patent: Nov. 2, 1999

[54] MOTOR VEHICLE SPEED CONTROL METHOD AND ARRANGEMENT

[75] Inventor: Peter Andreas, Gifhorn, Germany

[73] Assignee: Volkswagen AG, Wolfsburg, Germany

[21] Appl. No.: 08/985,070

[22] Filed: Dec. 4, 1997

[30] Foreign Application Priority Data

Dec. 4, 1996 [DE] Germany .......................... 196 50 168

[51] Int. Cl.$^6$ ................ B60Q 1/00; B60T 7/16
[52] U.S. Cl. .......... 340/441; 340/435; 340/903; 180/167; 701/70; 701/77; 701/96
[58] Field of Search .................. 340/441, 435, 340/903; 180/167, 169, 170, 172; 701/96, 70, 72, 77, 93

[56] References Cited

U.S. PATENT DOCUMENTS

| | | | |
|---|---|---|---|
| 3,921,749 | 11/1975 | Kawada | 180/98 |
| 4,158,841 | 6/1979 | Wüchner et al. | 343/7 |
| 4,519,469 | 5/1985 | Hayashi et al. | 180/169 |
| 4,622,636 | 11/1986 | Tachibana | 364/424 |
| 4,703,429 | 10/1987 | Sakata | 364/426 |
| 5,001,640 | 3/1991 | Matsumoto et al. | 364/426.02 |
| 5,101,351 | 3/1992 | Hattori | 180/167 |
| 5,148,721 | 9/1992 | Anan et al. | 180/179 |
| 5,189,619 | 2/1993 | Adachi et al. | 180/170 |
| 5,208,750 | 5/1993 | Kurami et al. | 180/168 |
| 5,218,542 | 6/1993 | Endo et al. | 180/169 |
| 5,396,426 | 3/1995 | Hibino et al. | 364/426 |
| 5,400,864 | 3/1995 | Winner et al. | 180/169 |
| 5,648,905 | 7/1997 | Izumi et al. | 364/461 |

FOREIGN PATENT DOCUMENTS 7232573 7/1995 Japan .

*Primary Examiner*—Donnie L. Crosland
*Attorney, Agent, or Firm*—Baker & Botts, L.L.P.

[57] ABSTRACT

In the motor vehicle speed control arrangement, the distance to an object detected in front of the motor vehicle is detected by a distance sensor and supplied to a control unit which forms one or more manipulated variables for setting the driving speed of the motor vehicle as a function of at least a desired distance to the detected object which is determined at least from the instantaneous driving speed and/or a prescribed desired speed. In order to improve the comfort performance of the speed control, the arrangement provides that, in the event of a loss of detection of the object by the distance sensor, the control unit determines the reason for the loss of detection of the object and forms the manipulated variables for setting the driving speed as a function of the reason for the loss of detection.

22 Claims, 3 Drawing Sheets

MOTOR VEHICLE SPEED CONTROL METHOD AND ARRANGEMENT

BACKGROUND OF INVENTION

This invention relates to a motor vehicle speed control method in which distance to an object in front of the motor vehicle is detected by a distance sensor and supplied to a control unit which generates one or more manipulated variables for controlling the driving speed of the motor vehicle as a function at least of a desired distance from the vehicle to the detected object. The desired distance is determined from at least the instantaneous driving speed and/or a prescribed desired speed. Furthermore, the invention relates to a motor vehicle speed control arrangement which includes a distance sensor for detecting the distance to an object in front of the motor vehicle and a control unit for generating a manipulated variable to control the driving speed of the motor vehicle as a function of at least a desired distance to the detected object which is determined from at least the instantaneous driving speed and/or a prescribed desired speed, and in which it is possible to supply at least the instantaneous driving speed and the distance to an object detected in front of the motor vehicle as actual variables.

U.S. Pat. No. 4,622,636 describes a method and arrangement for automatic motor vehicle speed control in which the driving speed is maintained at a selected speed if no vehicle is driving in front of the controlled vehicle whereas the speed is controlled in accordance with the distance to a vehicle in front if such a vehicle is detected. That patent deals with the problem which arises if a vehicle driving in front which is below a selected speed value suddenly is no longer detected. According to the patent both control functions are disabled if the driving speed is outside a predetermined range around the selected driving speed if there is no vehicle in front, or after a vehicle in front is no longer detected in a monitored region.

U.S. Pat. No. 5,648,905 discloses a distance controller for a motor vehicle by which, after the driving path of the motor vehicle has been determined, a vehicle located in front of the motor vehicle with which the motor vehicle is to dock is detected. Thereafter, the docking operation is performed. If the vehicle in front is no longer detected for any reason, the docking operation is terminated, that is to say the distance controller switches off.

Loss of detection of an object in front of a vehicle can be due to various reasons: the vehicle has initiated an overtaking operation; the road has a bend and the distance sensor does not detect the entire course of the bend; or the detected object has turned off the road. In each of these cases, the speed control must react differently to be acceptable to a driver.

SUMMARY OF THE INVENTION

Accordingly, it is an object of the present invention to provide a method and arrangement for motor vehicle speed control which overcomes disadvantages of the prior art.

Another object of the invention is to provide a motor vehicle speed control arrangement which takes account of loss of detection of an object in front of the vehicle and is largely adapted to human behavior.

These and other objects of the invention are attained by providing a speed control arrangement in which, in the event of a loss of detection of an object in front by the distance sensor, possible reasons for the loss of detection are evaluated, such as whether an overtaking operation has been initiated by the vehicle containing the sensor, whether there is a curve in front of the vehicle, or whether the object is no longer detected because it has turned off the road. Based upon this evaluation, manipulated variables for setting the driving speed are generated by a control unit as a function of the reason for the loss of detection of the object.

Preferably, in the event of a loss of detection of the object the distance last detected from the object is retained in the control unit and compared continuously with the distance traveled by the motor vehicle following the loss of detection.

As long as the distance traveled by the vehicle is less than or equal to the last detected distance to the detected object, the control unit determines whether an overtaking operation has been initiated. This is advantageously carried out by checking the operation of a left-hand turn indicator. If an overtaking operation has been detected and no new object has been detected in front of the vehicle, the control unit generates a manipulated variable for the driving speed as a function of a selected desired speed in conjunction with a desired acceleration for the overtaking operation. A speed selected by the driver is preferably used as the selected desired speed.

If the motor vehicle has traveled farther than the distance at which the distance sensor lost detection of the detected object and no overtaking operation has been initiated, the control unit checks whether the radius of curvature r of the road on which the vehicle is being driven is less than a predetermined curvature. If that is the case, the control unit generates a manipulated variable for the driving speed as a function of a desired speed which is dependent on the radius of curvature of the road in conjunction with a desired acceleration which is also dependent on the radius of curvature.

If the radius of curvature of the road on which the device is being driven is greater than a predetermined radius of curvature, the motor vehicle is determined to be on an essentially straight road section. The manipulated variable is then generated by the control unit as a function of the desired speed selected by the driver in conjunction with a desired acceleration which is preselected or can be calculated.

If the distance sensor detects an object in front of the vehicle during an overtaking operation, while driving in a curve, or while controlling of the speed on a straight stretch, the control unit generates the manipulated variable for the driving speed as a function at least of the desired distance from the vehicle to the detected object.

A further embodiment of the invention provides that, in the event that the radius of curvature of the road is smaller than a selected radius of curvature, the desired distance from the vehicle to a detected object is additionally determined as a function of the detection range of the distance sensor but in no event is the desired distance less than a minimum distance. This has the advantage that, in the event of a loss of detection of the object and subsequent re-detection of an object when driving in curves, the control unit does not generate any extremely differing manipulated variables for the driving speed. This prevents so-called "sawing" of the motor vehicle.

The speed control method according to the invention has the substantial advantage that it behaves like a human being in the event of a loss of detection of an object in front of the vehicle and, if appropriate, a renewed detection of the same object or a different one, thus increasing the acceptability of the control device to a vehicle operator.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
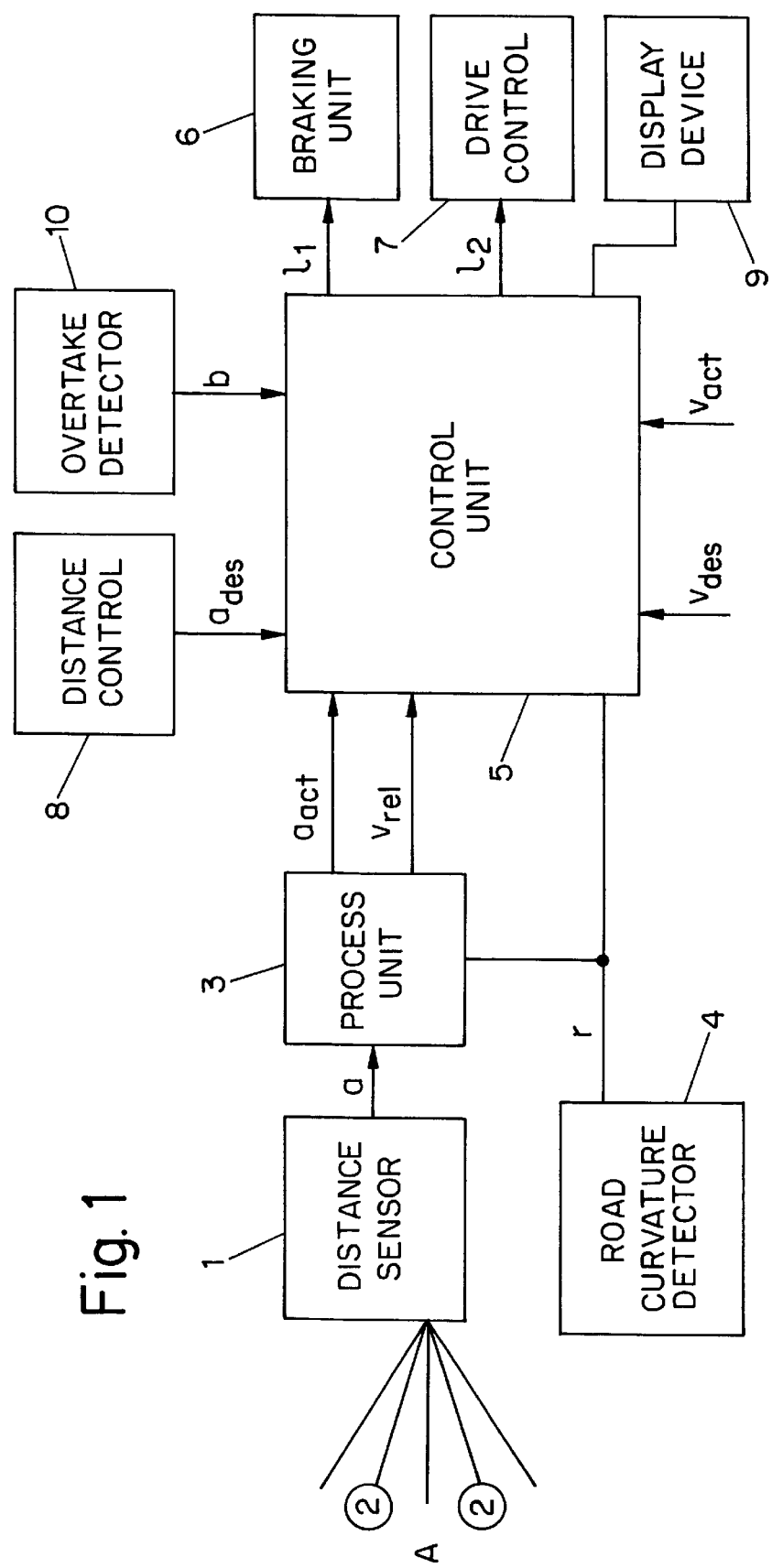
FIG. 1 is a schematic block diagram illustrating the arrangement of a representative embodiment of a speed controller according to the invention.

The typical embodiment of a speed control arrangement according to the invention which is integrated in a motor vehicle and operates autonomously shown in FIG. 1 includes a distance sensor 1 providing an output signal representing the distance data a from the vehicle to all the objects 2 located in the detection range A of the sensor. The distance data a produced by the distance sensor are transmitted to a processing unit 3 which carries out a classification of the objects 2 to determine whether they are objects relevant for speed control. Several possibilities are available for this purpose. On the one hand, it is possible to filter the distance data a from the distance sensor 1 using an output signal r from a curvature unit 4 for determining the radius of curvature of the road on which the vehicle is being driven. In this process, the radius of curvature can be determined using signals from wheel speed sensors on the wheels of the motor vehicle, a steering angle sensor, and yaw rate sensors, as well as from digitally stored data records of road profiles. In addition, parameters of the distance sensor 1 can also be used to validate the distance data a. For example, in the case of a multi-beam sensor, the lateral offset of an object 2 relative to the central beam is a measure of the relevance of the object. If an object is detected by more than one beam, a statement can be made concerning the width of the object. A statement can also be made as to whether the object is stationary or moving based on the change in relative speed between the motor vehicle and the detected object.

After such classification of the detected objects, the processing unit 3 relays the distance data $a_{act}$ of the relevant objects and their relative speed $V_{rel}$ to a control unit 5 which forms two manipulated variables I1 and I2 for a braking unit 6 and a drive control 7 for setting the driving speed of the vehicle. In addition to the distance data $a_{act}$ the control unit 5 is supplied with the desired speed $V_{des}$ prescribed by the driver, the relative speed between the motor vehicle and the detected object 2, the detected or determined radius of curvature r of the road on which the vehicle is being driven, the instantaneous driving speed $v_{act}$ the desired distance to a detected object $a_{des}$ which is set in a distance control 8, as well as a signal b for detecting an overtaking operation. Furthermore, a display device 9 which warns the vehicle driver in the event of danger can be connected to the control unit 5.

Figure 2A:
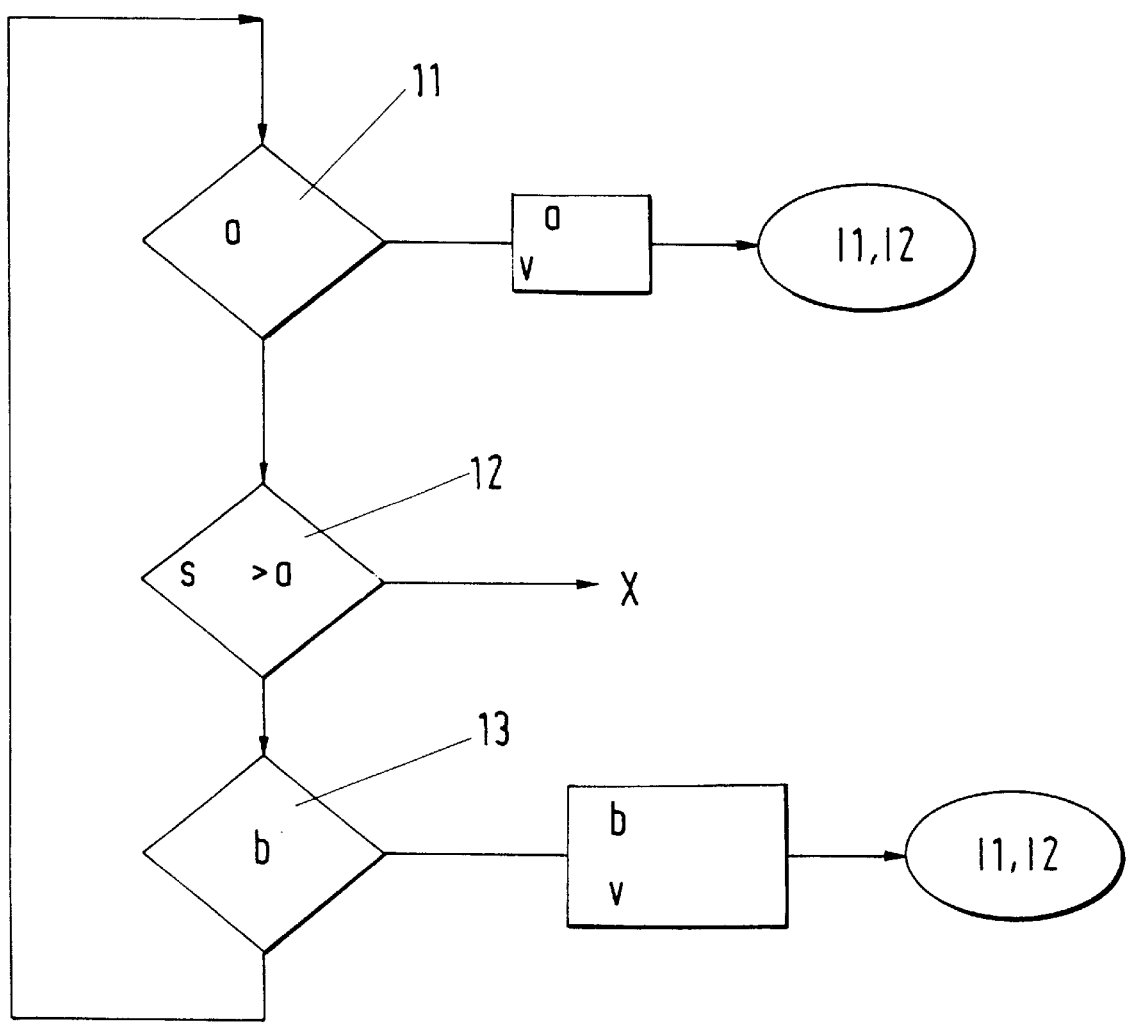
FIGS. 2a and 2b are flow charts illustrating the method of operation of a speed controller according to the invention.
Figure 2B:
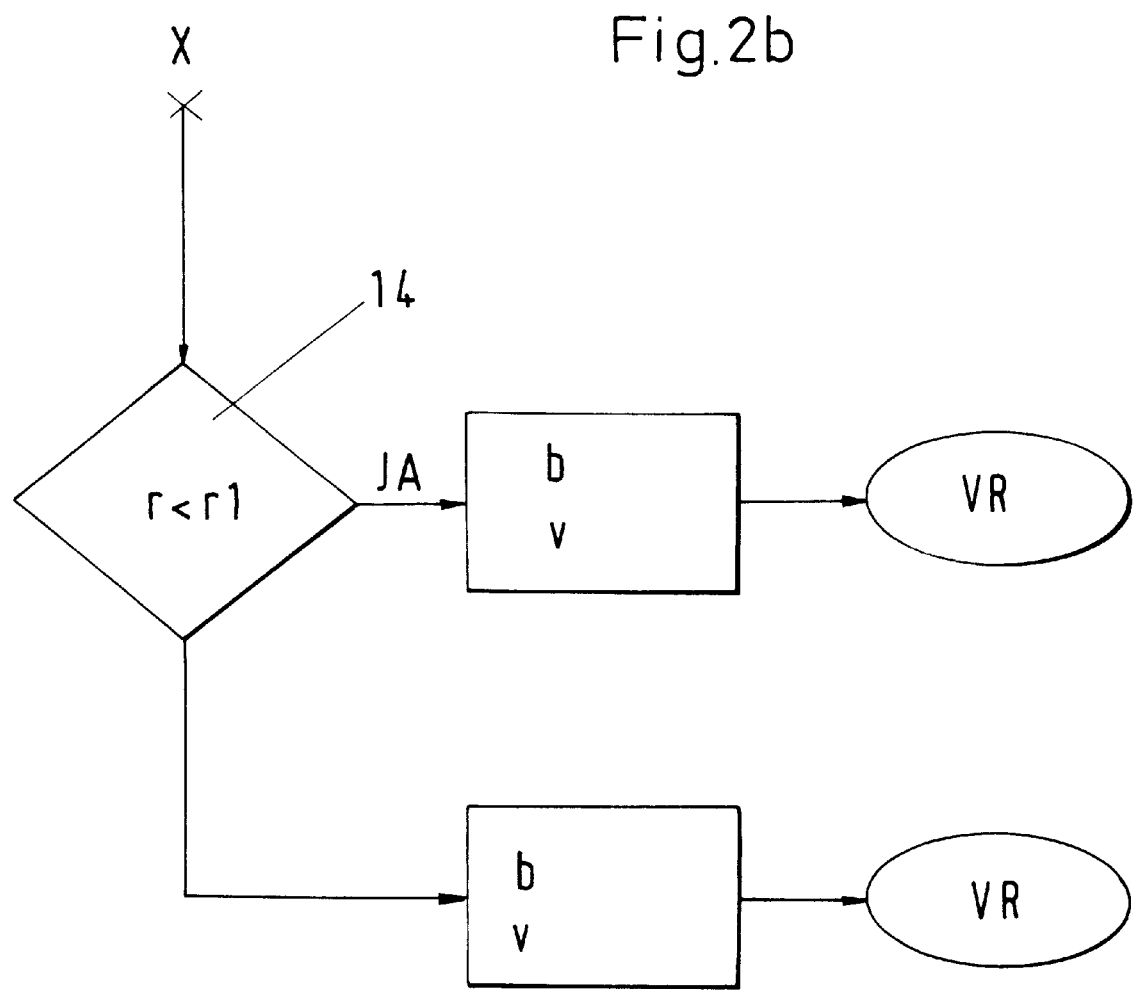

A description of the speed control method according to the invention in the event of a loss of the object is given below with the aid of the flow chart represented in FIGS. 2a and 2b. In the control unit 5, a first step 11 determines whether a detected object 2 is present and the distance data $a_{act}$ has been generated. If this is the case, the manipulated variables I1 and I2 are formed for the drive control 7 and/or the braking control 6 in order to set the driving speed at least as a function of a desired distance from the vehicle to the detected object. If no object has been detected by the distance sensor 1, that is to say there are no distance data $a_{act}$ the control unit 5 retains the last detected distance data $a_{last}$ to the detected object and, in step 12, compares the distance $S_{act}$ covered traveled by the vehicle since the last detection of the object with the last location of the object. If the motor vehicle has not yet reached that location, an interrogation is conducted in the next step 13 as to whether an overtaking operation has been initiated. This is performed, for example, by checking operation of the left-hand flasher b. If an overtaking operation has been initiated, the control unit 5 forms the manipulated variables I1 and I2 for the driving speed as a function of the desired speed $V_{des}$ prescribed by the driver and of a desired acceleration $b_{over}$ defined for the overtaking operation until an object is detected.

If the result in step 12 is that the motor vehicle has gone beyond the last detected location of the object, there is an interrogation in step 14 as to whether the radius of curvature r of the road on which the vehicle is being driven is smaller than a prescribed radius of curvature $r_1$. If the radius of curvature r is less than the prescribed radius of curvature $r_1$, it is assumed that a road curve is present, and the manipulated variables I1 and I2 for the driving speed are determined as a function of a desired speed $v_{curve}$ which is dependent on the radius of curvature r of the road on which the vehicle is being driven in conjunction with a desired acceleration $b_{curve}$ which is also dependent on the radius of curvature. Moreover, in this case the desired speed is fixed taking account of the designated speed $V_{des}$ selected by the driver. If an object 2 is detected while driving on a curve, the manipulated variables are formed as a function of the desired distance $a_{des}$ for the driving situation and the detecting range A of the distance sensor 1 and the calculation of the desired distance is carried out in such a way that the desired distance $a_{des}$ is reduced, if appropriate, to a minimum distance. The reason for this is that, when driving on curves an object is frequently detected only if the desired distance $a_{des}$ is less than the distance determined without considering the detecting range A. Otherwise the controller would attempt to observe the desired distance $a_{des}$, would lose the object again and accelerate again for this reason and when the object was detected again, the process would be repeated. Consequently, the detecting range A of the distance sensor is incorporated into the calculation of the desired distance in order to avoid this "sawing" action.

If the radius of curvature r of the road is larger than the prescribed radius of curvature $r_1$, which determine the presence of a road curve, it is assumed that the motor vehicle is located on an essentially straight road section. The object no longer detected must therefore have turned off the road or increased its speed above the prescribed desired speed $v_{des}$ and is beyond the detecting range A of the distance sensor 1. The manipulated variables I1 and I2 for the driving speed are then formed as a function of the prescribed desired speed $V_{des}$ in conjunction with a fixed desired acceleration $b_{mod}$.

Although the invention has been described herein with reference to specific embodiments, many modifications and variations therein will readily occur to those skilled in the art. Accordingly, all such variations and modifications are included within the intended scope of the invention.

I claim:

1. A motor vehicle speed control method comprising:
   detecting distances to an object in front of the motor vehicle by a distance sensor and supplying corresponding signals to a control unit;
   forming in the control unit, as a function of at least the instantaneous driving speed and a prescribed desired speed, manipulated variables for setting the driving speed of the motor vehicle as a function of a desired distance; and if the object is no longer detected by this distance sensor, determining the reason for the loss of detection of the object in the control unit and forming manipulated variable for setting the driving speed by the control unit as a function of the reason for the loss of detection of the object.

2. A method according to claim 1 wherein the loss of detection of the object is determined by a loss of object detection signals from the distance sensor.

3. A method according to claim 1 wherein, in the event of a loss of detection of the object, the distance last detected to the detected object is stored in the control unit and compared with the distance traveled by the motor vehicle since the loss of detection of the object.

4. A method according to claim 3 wherein, in the event that the distance covered by the motor vehicle since the loss of detection of the object is less than or equal to the last detected distance to the detected object, the control unit carries out a check to determine whether an overtaking operation has been initiated.

5. A method according to claim 4 wherein, in the event that an overtaking operation has been initiated, the control unit forms a manipulated variable for the driving speed as a function of the prescribed desired speed in conjunction with a desired acceleration determined for the overtaking operation.

6. A method according to claim 3 wherein, in the event that the distance traveled by the motor vehicle since the loss of detection of the object is greater than the last detected distance to the detected object, the control unit carries out a check to determine whether the road on which the vehicle is being driven has a radius of curvature of at least a predetermined magnitude.

7. A method according to claim 6 wherein, in the event that the radius of curvature is smaller than the predetermined radius of curvature, the control unit forms manipulated variables for the driving speed as a function of a desired speed which are dependent on the radius of curvature of the road on which the vehicle is being driven in conjunction with a desired acceleration which is dependent on the radius of curvature.

8. A method according to claim 6 wherein, in the event that the radius of curvature of the road on which the vehicle is being driven is greater than the predetermined radius of curvature, the control unit forms manipulated variables for the driving speed as a function of the prescribed desired speed in conjunction with a selected acceleration.

9. A method according to claim 1 wherein, in the event that a new object is detected by the distance sensor after the loss of detection of the object, the control unit forms manipulated variables for the driving speed at least as a function of a desired distance to the detected object.

10. A method according to claim 1 wherein, in the event that a radius of curvature of the road on which the vehicle is being driven is less than a predetermined radius of curvature, the desired distance to the object is additionally formed as a function of the detection range of the distance sensor.

11. A method according to claim 10 wherein the desired distance is formed as a function of the detection range of the distance sensor and is not less than a selected distance.

12. A motor vehicle speed control arrangement comprising:
a distance sensor for detecting distances from the motor vehicle to an object in front of the motor vehicle;
a control unit for forming manipulated variables for the driving speed of the motor vehicle as a function of a desired distance to an object in front of the motor vehicle which is determined from at least the instantaneous driving speed, the distance to the detected object and a prescribed desired speed;
means for supplying to the control unit the instantaneous driving speed and the distance to an object detected in front of the motor vehicle and;
means for determining, in the event of loss of detection of the object by the distance sensor, the reason for the loss of detection of the object;
wherein the control unit includes means for forming the manipulated variables for setting the driving speed as a function of the reason for the loss of detection of the object.

13. A motor vehicle speed control arrangement according to claim 12 wherein the loss of detection of the object is determined by a loss of object detection signals from the distance sensor.

14. A motor vehicle speed control arrangement according to claim 12 wherein, in the event of a loss of detection of the object, the control unit retains the last detected distance to the object and compares that distance with the distance traveled by the motor vehicle after the loss of detection of the object.

15. A motor vehicle speed control arrangement according to claim 14 wherein, in the event that the distance traveled by the motor vehicle after loss of detection of an object is less or equal to the distance to the object last detected, the control unit determines whether an overtaking operation has been initiated.

16. A motor vehicle speed control arrangement according to claim 15 wherein, in the event of an overtaking operation by the motor vehicle, the control unit forms manipulated variables for the driving speed as a function of the prescribed desired speed in conjunction with a desired acceleration for the overtaking operation.

17. A motor vehicle speed control arrangement according to claim 14 wherein, in the event that the distance traveled by the motor vehicle after loss of detection of an object is greater than the distance to the detected object last detected, the control unit determines whether the road on which the vehicle is being driven has a radius of curvature which is less than a prescribed radius of curvature.

18. A motor vehicle speed control arrangement according to claim 17 wherein, in the event that the radius of curvature of the road is less than the prescribed radius of curvature, the control unit forms manipulated variables for the driving speed as a function of a desired speed which are dependent on the radius of curvature of the road on which the vehicle is being driven in conjunction with a desired acceleration which is dependent on the radius of curvature.

19. A motor vehicle speed control arrangement according to claim 17 wherein, in the event that the radius of curvature of the road is greater than the prescribed radius of curvature, the control unit forms manipulated variables for the driving speed as a function of the prescribed desired speed in conjunction with a desired acceleration.

20. A motor vehicle speed control arrangement according to claim 12 wherein, in the event of detection of a new object by the distance sensor after the loss of detection of the object, the control unit forms manipulated variables for the driving speed as a function of at least the desired distance.

21. A motor vehicle speed control arrangement according to claim 12 wherein, in the event that a radius of curvature of the road on which the vehicle is being driven is less than a prescribed radius of curvature, the desired distance is formed additionally as a function of the detection range of the distance sensor.

22. A motor vehicle speed control arrangement according to claim 21 wherein the desired distance formed by the control unit as a function of the detection range of the distance sensor is no less than a prescribed distance.

* * * * *